(12) United States Patent
Taniyama et al.

(10) Patent No.: US 9,159,475 B2
(45) Date of Patent: Oct. 13, 2015

(54) HIGH PRESSURE BUSHING OF ROTATING ELECTRICAL MACHINE AND ROTATING ELECTRICAL MACHINE

(71) Applicant: KABUSHIKI KAISHA TOSHIBA, Tokyo (JP)

(72) Inventors: Yoshihiro Taniyama, Tokyo (JP); Yasuo Kabata, Yokohama (JP); Mikio Kakiuchi, Tokyo (JP); Toshio Kitajima, Yokohama (JP); Takeo Urita, Sagamihara (JP); Koji Matsuyama, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 277 days.

(21) Appl. No.: 13/754,044

(22) Filed: Jan. 30, 2013

(65) Prior Publication Data

US 2013/0192025 A1    Aug. 1, 2013

(30) Foreign Application Priority Data

Jan. 30, 2012   (JP) .................... 2012-016412

(51) Int. Cl.
*H01B 17/58* (2006.01)
*H02K 5/22* (2006.01)
*H02K 9/00* (2006.01)

(52) U.S. Cl.
CPC .............. *H01B 17/583* (2013.01); *H02K 5/225* (2013.01); *H02K 9/00* (2013.01); *Y10T 16/063* (2015.01)

(58) Field of Classification Search
CPC ............. H02K 9/00; H02K 9/08; H02K 9/10; H02K 9/12; H02K 9/16; H02K 3/22; H02K 1/20; H02K 3/24; H02K 9/18; H01B 17/583
USPC ............. 310/52, 53, 55, 58, 60 A, 71; 16/2.2; 174/15.3, 17 GF, 14 BH
See application file for complete search history.

(56) References Cited

U.S. PATENT DOCUMENTS

| | | | | |
|---|---|---|---|---|
| 1,567,201 | A | * | 12/1925 | Steinberger .................. 174/31 R |
| 2,900,538 | A | * | 8/1959 | Tudge .............................. 310/59 |
| 3,513,437 | A | * | 5/1970 | McMorris ...................... 439/184 |
| 3,626,079 | A | * | 12/1971 | Keen et al. .................... 174/15.3 |
| 4,132,853 | A | * | 1/1979 | Wagenaar ................. 174/12 BH |
| 4,169,965 | A | * | 10/1979 | Cronin ......................... 174/15.3 |
| 4,424,402 | A | * | 1/1984 | Murase ........................ 174/15.3 |
| 2010/0270875 | A1 | * | 10/2010 | Kabata et al. .................... 310/55 |

* cited by examiner

*Primary Examiner* — Quyen Leung
*Assistant Examiner* — Noli Manaloto
(74) *Attorney, Agent, or Firm* — Oblon, McClelland, Maier & Neustadt, L.L.P.

(57) ABSTRACT

According to one embodiment, there is provided a high pressure bushing arranged through by penetrating a stator frame of a rotating electrical machine in which a cooling gas is sealed. At least a communicating hole is provided in the hollow connecting conductor and at least a reflux hole is provided in the gas circulation pipe, such that the cooling gas flows in both of the first gap and the second gap, passes through an inner side of the gas circulation pipe, and is discharged to the machine inner side.

16 Claims, 18 Drawing Sheets

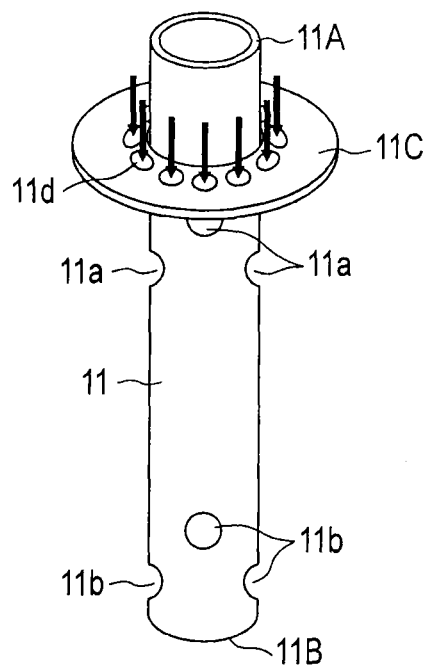
F I G. 21
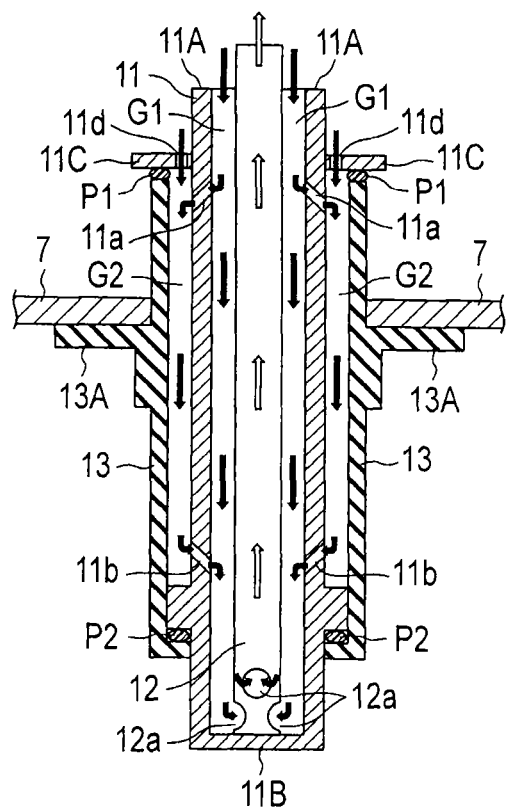
F I G. 22

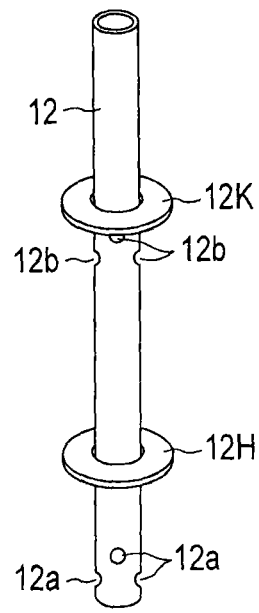
F I G. 31
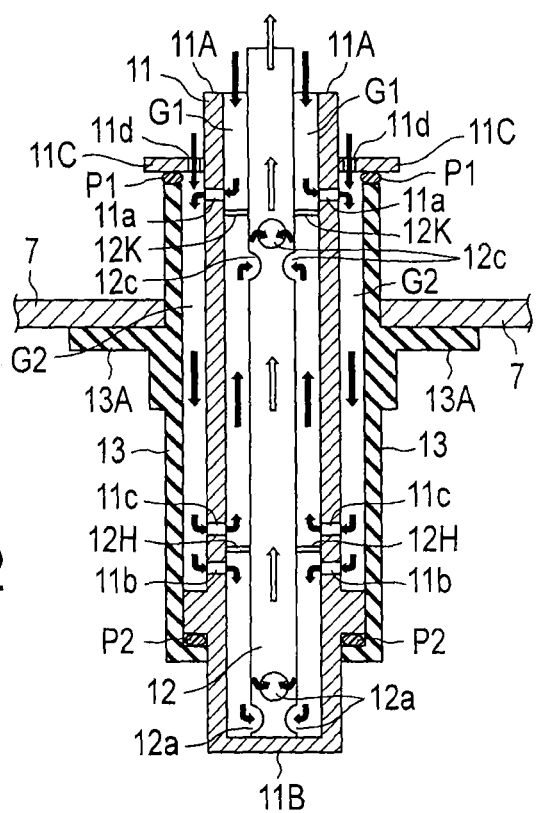
F I G. 32

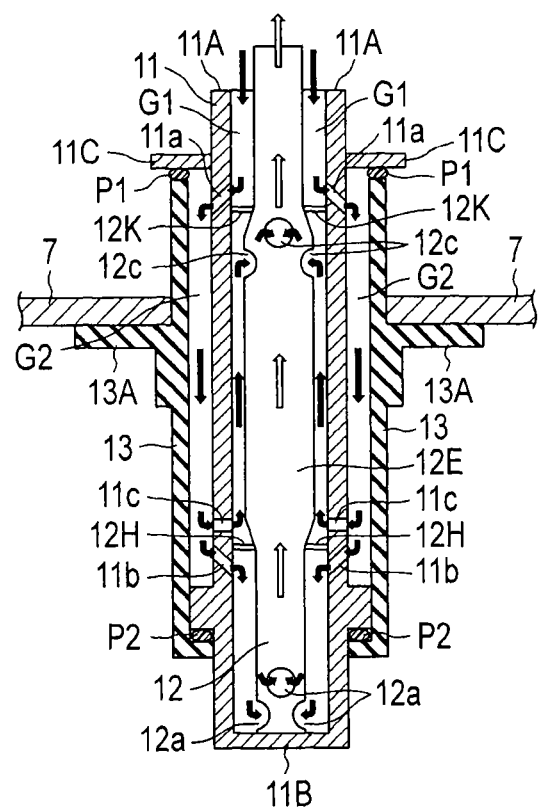
F I G. 35

HIGH PRESSURE BUSHING OF ROTATING ELECTRICAL MACHINE AND ROTATING ELECTRICAL MACHINE

CROSS-REFERENCE TO RELATED APPLICATIONS

This application is based upon and claims the benefit of priority from Japanese Patent Application No. 2012-016412, filed Jan. 30, 2012, the entire contents of which are incorporated herein by reference.

FIELD

Embodiments described herein relate generally to a high pressure bushing of a rotating electrical machine, and the rotating electrical machine.

BACKGROUND

Generally, a rotating electrical machine such as a turbine generator is configured to seal hydrogen gas and the like within the device, and to cool respective sections such as a rotor, a stator iron core, and a stator coil by using the same as a coolant.

Further, a stator frame of the rotating electrical machine is provided with a high pressure bushing that penetrates the stator frame. The stator coil of the rotating electrical machine is wire bound to the high pressure bushing via a connecting conductor, and an electric output can be taken out from the rotating electrical machine through a hollow connecting conductor provided in the high pressure bushing. Since the high pressure bushing generates heat by a large current flowing in the hollow connecting conductor, the cooling gas introduced from inside the device is used for cooling.

Generally, the high pressure bushing structurally uses only an inner circumferential surface side of the hollow connecting conductor as a cooling surface. An outer circumferential surface side of the hollow connecting conductor ensures a space for maintaining an insulating distance, an insulating cylinder such as glass is also provided, and a sealing section that is vulnerable to heat is provided, however, an effect of cooling is not sufficiently enjoyed on the side thereof. In order to perform a sufficient cooling, a current value with which the current can be flown must be made small or the high pressure bushing must be made large by enlarging a conductor cross sectional area, neither of which is a crucial solution.

Under the circumstances, it is desired to provide a high pressure bushing and a rotating electrical machine, capable of improving cooling efficiency.

BRIEF DESCRIPTION OF THE DRAWINGS

FIG. 21 is a perspective diagram showing a modification of a hollow connecting conductor 11 and a connecting conductor support 11C shown in FIG. 20;

FIG. 22 is a vertical cross sectional diagram showing another modification of the high pressure bushing shown in FIG. 20;

FIG. 31 is a perspective diagram showing an example of a structure of partition plates 12H, 12K and the like shown in FIG. 30;

FIG. 32 is a vertical cross sectional diagram showing a modification of the high pressure bushing shown in FIG. 30;

FIG. 35 is a vertical cross sectional diagram showing another modification of the high pressure bushing shown in FIG. 30.

DETAILED DESCRIPTION

Embodiments will be described with reference to the drawings.

In general, according to one embodiment, there is provided a high pressure bushing arranged through by penetrating a stator frame of a rotating electrical machine in which a cooling gas is sealed, the high pressure bushing comprising: a hollow connecting conductor that has a machine outer side end portion sealed, and introduces the cooling gas within the machine from a machine inner side end portion; a gas circulation pipe that is arranged in an inner circumference side of the hollow connecting conductor with a first gap, and discharges the cooling gas toward a machine inner side; and an insulating cylinder that is arranged in an outer circumference side of the hollow connecting conductor with a second gap, and electrically insulates the hollow connecting conductor and the stator frame, wherein at least a communicating hole is provided in the hollow connecting conductor and at least a reflux hole is provided in the gas circulation pipe, such that the cooling gas flows in both of the first gap and the second gap, passes through an inner side of the gas circulation pipe, and is discharged to the machine inner side.

(Matters Common to Respective Embodiments)

Figure 1:
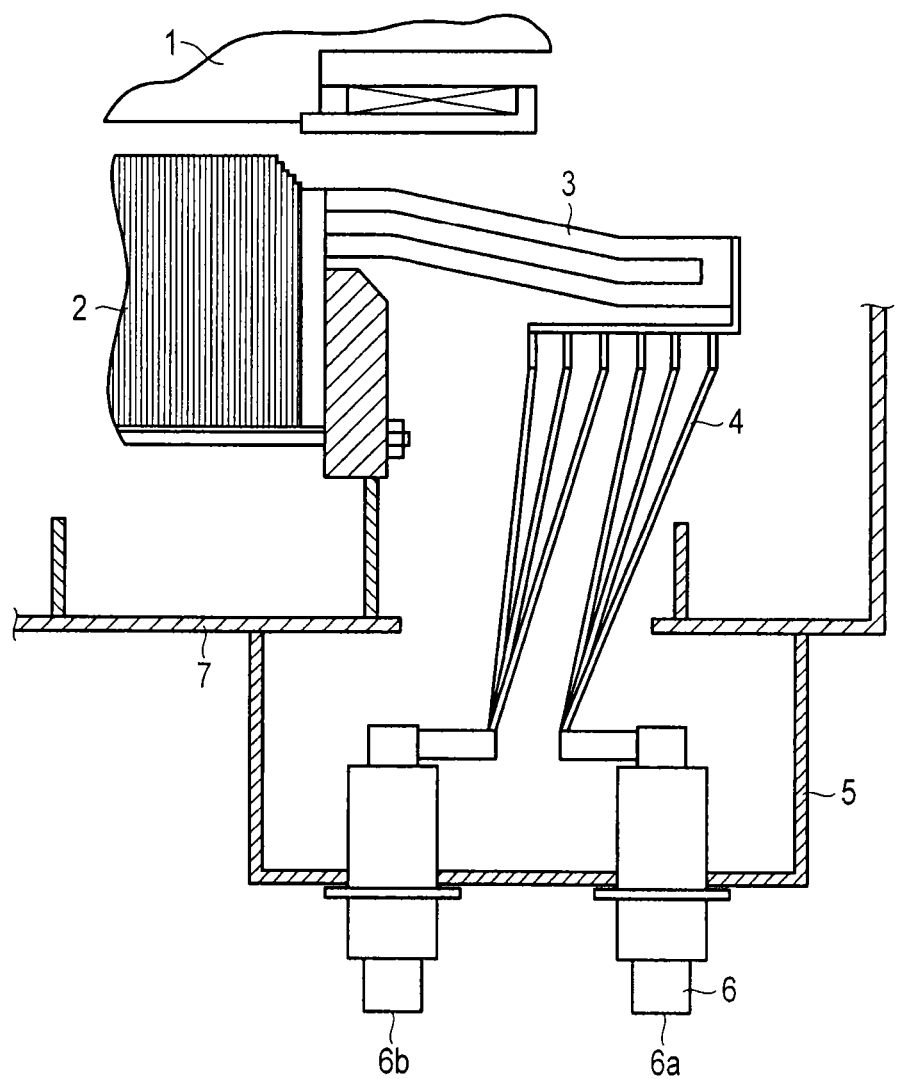
FIG. 1 shows a vertical cross sectional diagram showing an example of a configuration of a rotating electrical machine common to first to fourth embodiments.

FIG. 1 shows a vertical cross sectional diagram showing an example of a configuration of a rotating electrical machine common to first to fourth embodiments;

The rotating electrical machine shown in FIG. 1 is for example a large capacity turbine generator, which is configured to seal a hydrogen gas within the device, and to cool the respective sections such as a rotor 1, a stator iron core 2, and a stator coil 3 with the gas as a coolant. Further, it is wire bound to a high pressure bushing 6a provided in a stator frame 7 configuring an output terminal box 5 from the stator coil 3 via a connecting conductor 4, and it is configured to take out an electric output to outside the device. Further, when the stator coil 3 is wire bound in a star-connection and a neutral point thereof is to be grounded, the electric output is taken outside via a high pressure bushing 6b provided in the stator frame 7, and the neutral point is wire bound thereto. The aforementioned high pressure bushings 6a, 6b are configured to perform cooling by introducing the cooling gas to their respective insides.

In the following first to fourth embodiments, a configuration example of one of a plurality of high pressure bushings 6a, 6b shown in FIG. 1, for example, of the high pressure bushing 6a will be described.

First Embodiment

Firstly, the first embodiment will be described with reference to FIG. 2 to FIG. 14. Notably, elements common to the drawings are given the same signs.

Figure 2:
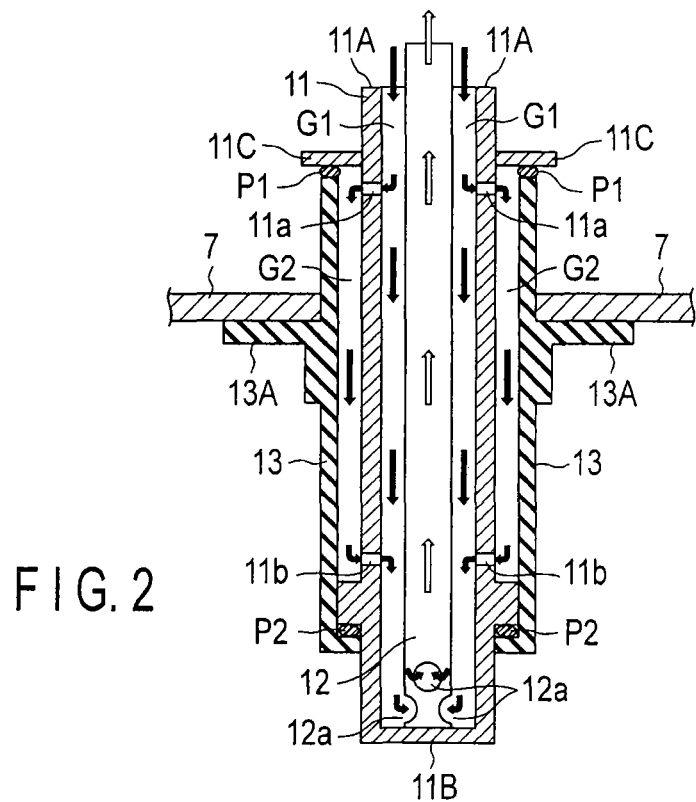
FIG. 2 is a vertical cross sectional diagram showing an example of a structure of a high pressure bushing and a cooling gas circulating flow of the first embodiment.

FIG. 2 is a vertical cross sectional diagram showing an example of a structure of the high pressure bushing and a cooling gas circulating flow of the first embodiment.

The high pressure bushing shown in FIG. 2 is provided by penetrating the stator frame 7 that configures the output terminal box 5 of the rotating electrical machine, and includes a hollow connecting conductor 11, a gas circulation pipe 12, and an insulating cylinder 13 as its primary constituent elements.

The hollow connecting conductor 11 has a structure in which its machine outer side end portion 11B sealed, and the cooling gas within the machine is introduced from a machine inner side end portion 11A. The gas circulation pipe 12 is provided in an inner circumference side of the hollow connecting conductor 11 with a gap G1 in between, and has a structure in which its machine outer side end portion is attached to a bottom portion of the hollow connecting conductor 11, and the cooling gas is discharged to a machine inner side. The insulating cylinder 13 is configured of glass and the like, is provided in an outer circumference side of the hollow connecting conductor 11 with a gap G2 in between, and has a structure in which its machine outer side end portion is sealed, and the hollow connecting conductor 11 and the stator frame 7 are electrically insulated.

The aforementioned hollow connecting conductor 11 forms an outer conductor connecting section at a portion that penetrates the insulating cylinder 13, and is connected to a current lead not shown on an outside of the rotating electrical machine. Further, a connecting conductor support 11C that supports the hollow connecting conductor being connected to a machine inner side end portion of the insulating cylinder 13 is directly attached to an outer circumferential surface of the hollow connecting conductor 11 by welding and the like. A gasket P1 is provided to be intervened at a connecting portion of the machine inner side end portion of the insulating cylinder 13 and the connecting conductor support 11C, whereas on the other hand, a gasket P2 is provided to be intervened at a connecting portion of the machine outer side end portion of the insulating cylinder 13 and the hollow connecting conductor 11, and sealing process is performed so that the cooling gas within the machine does not leak out of the device.

The aforementioned gas circulation pipe 12 has an outlet side of the cooling gas connected to a portion within the rotating electrical machine device with a lower pressure than a cooling gas pressure inside the output terminal box 5 that is an inlet side of the cooling gas of the high pressure bushing, for example a low pressure chamber at a fan inlet, via a pipe that is not shown. The cooling gas flows in the high pressure bushing by a pressure difference generated between them, and the heated hollow connecting conductor 11 and the like are configured to be cooled.

The aforementioned insulating cylinder 13 includes a flange section 13A, the flange section 13A is fixed to the stator frame 7, and a sealing process is performed. The flange section 13A of the insulating cylinder 13 is formed for example of metal, and is formed integrally with the insulating portion by adhesive and the like.

Especially, in the first embodiment, the hollow connecting conductor 11 includes a plurality of communicating holes 11a located in the machine inner side and a plurality of communicating holes 11b located in the machine outer side, and the gas circulation pipe 12 includes a plurality of reflux holes 12a located in the vicinity of the machine outer side end portion of the gas circulation pipe 12.

By the aforementioned configuration, the cooling gas within the machine is introduced into the gap G1 from the machine inner side end portion 11A of the hollow connecting conductor 11, and while passing through an inner circumference side passage of the hollow connecting conductor 11, a part of the cooling gas introduced into the gap G1 branches to pass through first communicating holes 11a, is introduced into the gap G2, passes through an outer circumference side passage of the hollow connecting conductor 11, passes through the communicating holes 11b, and merges with the cooling gas that passed through the inner circumference side passage of the hollow connecting conductor 11, and the merged cooling gas passes through reflux holes 12a and passes through the inner side of the gas circulation pipe 12, and is discharged to the machine inner side.

By configuring as above, since the cooling gas flows in both the inner circumference side passage and the outer circumference side passage of the hollow connecting conductor 11, the hollow connecting conductor 11 can sufficiently be cooled from both surfaces of the inner circumferential surface and the outer circumferential surface, and cooling of the gaskets P1, P2 and the like can also be performed sufficiently, so cooling efficiency of the entire high pressure bushing can be improved.

Figure 3:
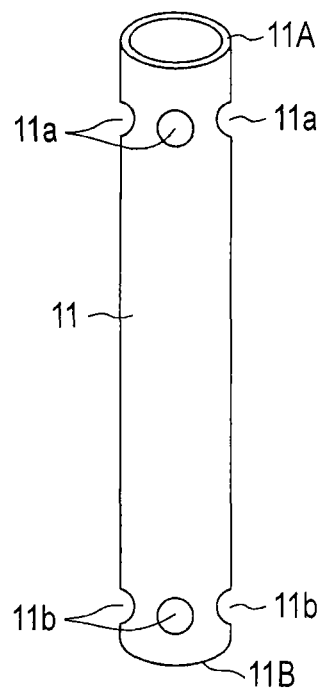
FIG. 3 is a perspective diagram showing an example of a structure of a hollow connecting conductor 11 shown in FIG. 2.
Figure 4:
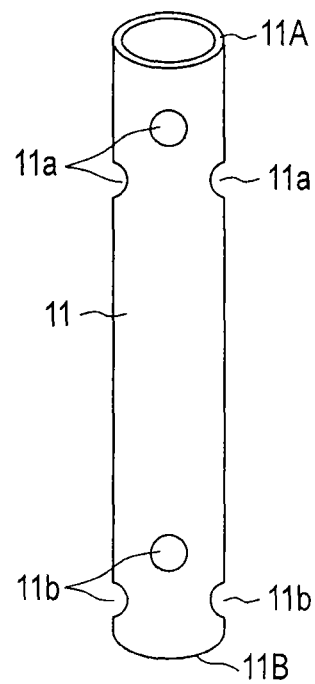
FIG. 4 is a perspective diagram showing a modification of the hollow connecting conductor 11 shown in FIG. 3.

FIG. 3 is a perspective diagram showing an example of a structure of the hollow connecting conductor 11 shown in FIG. 2. Further, FIG. 4 is a perspective diagram showing a modification of the hollow connecting conductor 11 shown in FIG. 3.

In the example of FIG. 3, the plurality of communicating holes 11a provided in the hollow connecting conductor 11 is arranged apart so as to align at a same height relative to a longitudinal direction. An arrangement of the plurality of communicating holes 11b is also similar. On the other hand, in the example of FIG. 4, the plurality of communicating holes 11a provided in the hollow connecting conductor 11 form a zigzag alignment. An arrangement of the plurality of communicating holes 11b is also similar. Although either of the arrangements of FIG. 3 and FIG. 4 can be employed, when the zigzag alignment as in FIG. 4 is formed, the cooling gas appropriately disperses, and temperature equalization becomes possible. Further, a technique of this arrangement is adapted to the arrangement of the reflux holes 12a provided in the gas circulation pipe 12.

Figure 5:
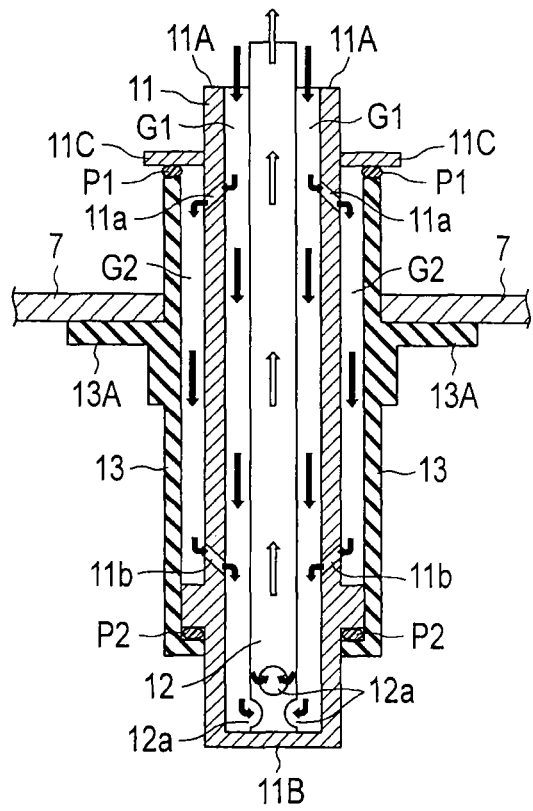
FIG. 5 is a vertical cross sectional diagram showing a modification of the high pressure bushing shown in FIG. 2.

FIG. 5 is a vertical cross sectional diagram showing a modification of the high pressure bushing shown in FIG. 2.

Figure 6:
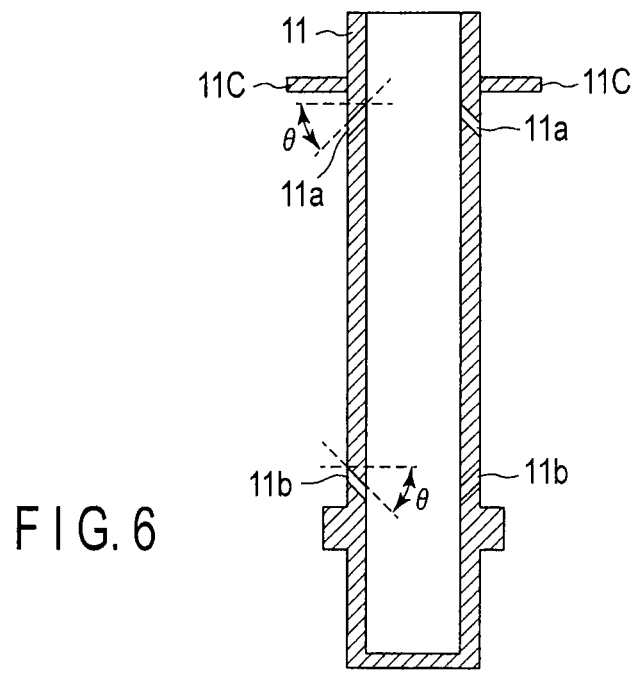
FIG. 6 is a diagram for explaining orientations of a plurality of communicating holes 11a, 11b shown in FIG. 5.

Whereas an orientation toward which the cooling gas flows in the plurality of communicating holes 11a, 11b shown in the example of FIG. 2 as above is directed to a direction vertical to a wall surface of the hollow connecting conductor 11, an orientation toward which the cooling gas flows in the plurality of communicating holes 11a, 11b shown in FIG. 5 is tilted toward the machine outer side from the direction vertical to the wall surface of the hollow connecting conductor 11. For example, as shown in FIG. 6, boring is performed in a direction that is tilted toward the machine outer side by an angle θ from the direction vertical to the wall surface of the hollow connecting conductor 11. The angle θ in this case is preferably within a range of 20° to 80°, which is dependent on a driving pressure of the cooling gas and a thickness of the wall of the hollow connecting conductor 11.

By configuring as above, gas flow pressure loss such as branching loss and colliding loss upon the cooling gas passing through the communicating holes 11a, 11b can be reduced.

Hereinbelow, various examples of adjusting an amount distribution of the cooling gas flowing in both the inner circumference side passage and the outer circumference side passage of the hollow connecting conductor 11 by providing a structure that causes a cross sectional area of a part of the inner circumference side passage of the hollow connecting conductor 11 to be smaller (for example, a structure to narrow the passage).

Figure 7:
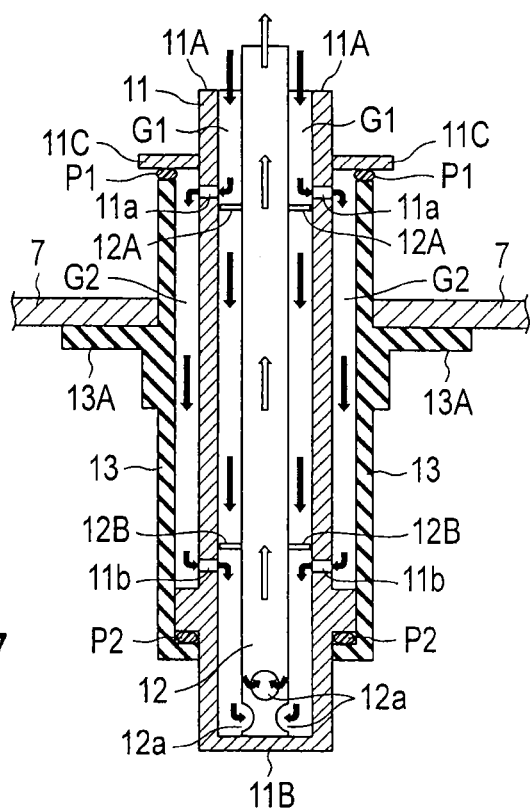
FIG. 7 is a vertical cross sectional diagram showing another modification of the high pressure bushing shown in FIG. 2.
Figure 8:
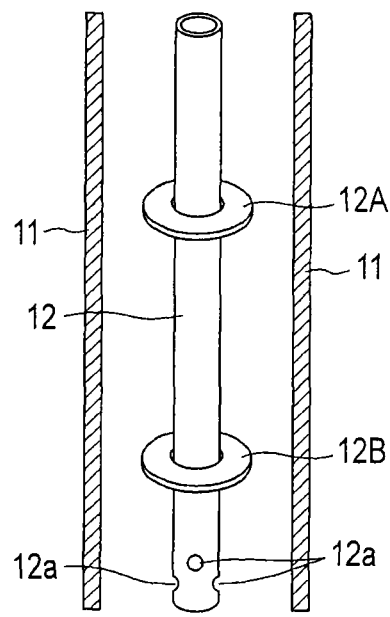
FIG. 8 is a perspective diagram showing an example of a structure of baffle plates 12A, 12B and the like shown in FIG. 7.

FIG. 7 is a vertical cross sectional diagram showing another modification of the high pressure bushing shown in FIG. 2. Further, FIG. 8 is a perspective diagram showing an example of a structure of disk-shaped baffle plates 12A, 12B and the like shown in FIG. 7.

In the example of FIG. 7, the baffle plate 12A that causes a part of the cross sectional area of the inner circumference side passage of the hollow connecting conductor 11 to be smaller in the gas circulation pipe 12 is provided in a position farther from the machine than the communicating holes 11a, and the baffle plate 12B that causes a part of the cross sectional area of the inner circumference side passage of the hollow connecting conductor 11 to be smaller in the gas circulation pipe 12 is provided in a position nearer to the machine than the communicating holes 11b. For example, as shown in FIG. 8, the disk-shaped baffle plates 12A, 12B are respectively provided on the outer circumferential surface of the gas circulation pipe 12. Notably, the shape is not limited to the disk-shape, and members with other shapes may be used so long as the passage is narrowed.

By configuring as above, the amount distribution of the cooling gas flowing in both the inner circumference side passage and the outer circumference side passage of the hollow connecting conductor 11 can be adjusted with satisfactory balance. Further, the amount of the cooling gas flowing in the outer circumference side passage of the hollow connecting conductor 11 can easily be increased, and the cooling efficiency on the outer circumference side of the hollow connecting conductor 11 can be made higher. Further, even in a case where the communicating holes 11a and the like are small, a larger amount of cooling gas can be branched to the outer circumference side of the hollow connecting conductor 11, and an increase in heat generation density due to a decrease in the cross sectional area where a current passes caused by communicating hole boring can be avoided.

Figure 9:
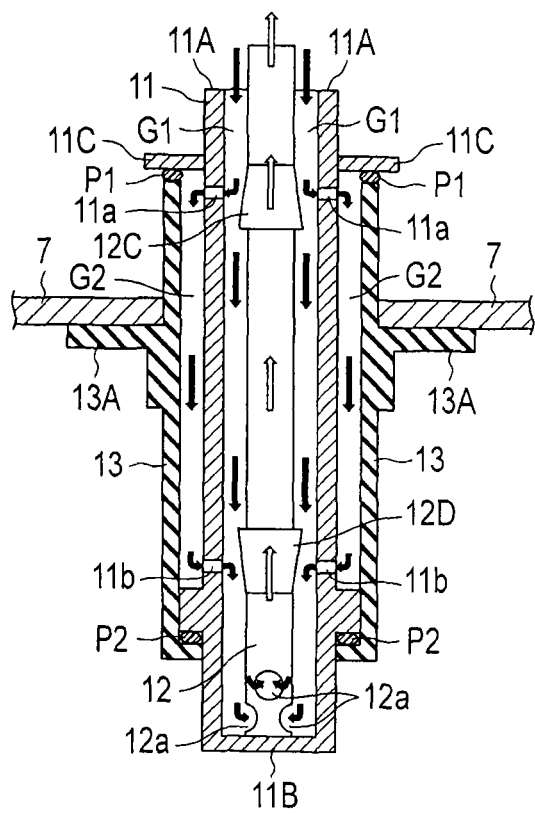
FIG. 9 is a vertical cross sectional diagram showing another modification of the high pressure bushing shown in FIG. 2.

FIG. 9 is a vertical cross sectional diagram showing another modification of the high pressure bushing shown in FIG. 2.

In the example of FIG. 9, an umbrella-shaped (or conical parallelepiped-shaped) wind shield plate 12C that causes a part of the cross sectional area of the inner circumference side passage of the hollow connecting conductor 11 approaching toward the machine outer side to be reduced from a first area to a second area is provided in the gas circulation pipe 12 in the vicinity of the communicating holes 11a, and an umbrella-shaped (or conical parallelepiped-shaped) wind shield plate 12D that causes a part of the cross sectional area of the inner circumference side passage of the hollow connecting conductor 11 approaching toward the machine outer side to be enlarged from the second area to the first area is provided in the gas circulation pipe 12 in the vicinity of the communicating holes 11b.

By configuring as above, similar effects as in the example of FIG. 7 can be obtained, and since the cross sectional area of the inner circumference side passage of the hollow connecting conductor 11 being configured to gradually change along the flow of the cooling gas, a turbulence in the cooling gas flow in the vicinities of the wind shield plates 12C, 12D is made smaller, the gas flow pressure loss can be suppressed, and rectifying effect can be enhanced.

Figure 10:
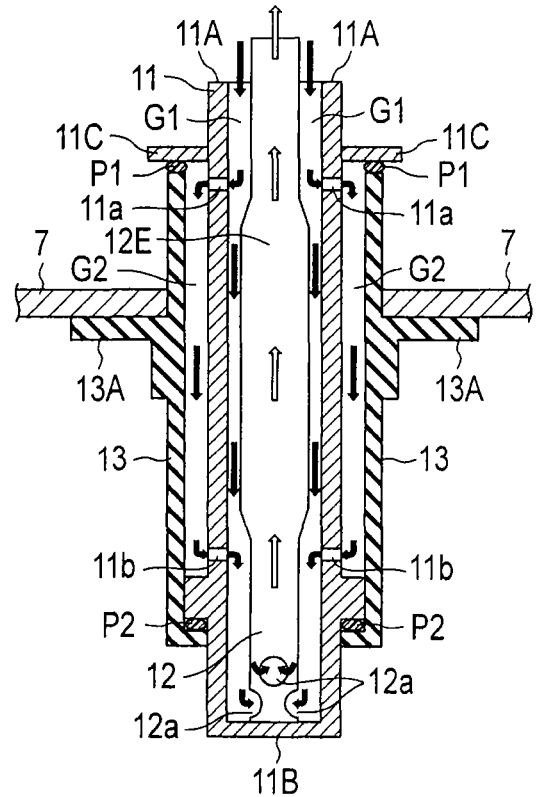
FIG. 10 is a vertical cross sectional diagram showing another modification of the high pressure bushing shown in FIG. 2.

FIG. 10 is a vertical cross sectional diagram showing another modification of the high pressure bushing shown in FIG. 2.

In the example of FIG. 10, the gas circulation pipe 12 has an intermediate thick portion 12E that causes a part of the cross sectional area of the inner circumference side passage of the hollow connecting conductor 11 to be smaller in a position farther from the machine than the communicating holes 11a and to be smaller in a position nearer to the machine than the communicating holes 11b, and also has shapes at both sides thereof similar to the aforementioned umbrella-shaped wind shield plates 12C, 12D. That is, similar to the example of FIG. 9, the gas circulation pipe 12 has the shape that causes a part of the cross sectional area of the inner circumference side passage of the hollow connecting conductor 11 approaching toward the machine outer side to be reduced from the first area to the second area in the vicinity of the communicating holes 11a, and has the shape that causes a part of the cross sectional area of the inner circumference side passage of the hollow connecting conductor 11 approaching toward the machine outer side to be enlarged from the second area to the first area in the vicinity of the communicating holes 11b.

By configuring as above, similar effects as in the example of FIG. 9 can be obtained, and the turbulence in the cooling gas flow in the vicinities of the umbrella-shaped portions can further be made smaller, and the cooling gas can more smoothly be circulated, and the cooling efficiency for the hollow connecting conductor 11 can be improved by the flow rate of the cooling gas being increased at the intermediate thick portion 12E.

Figure 11:
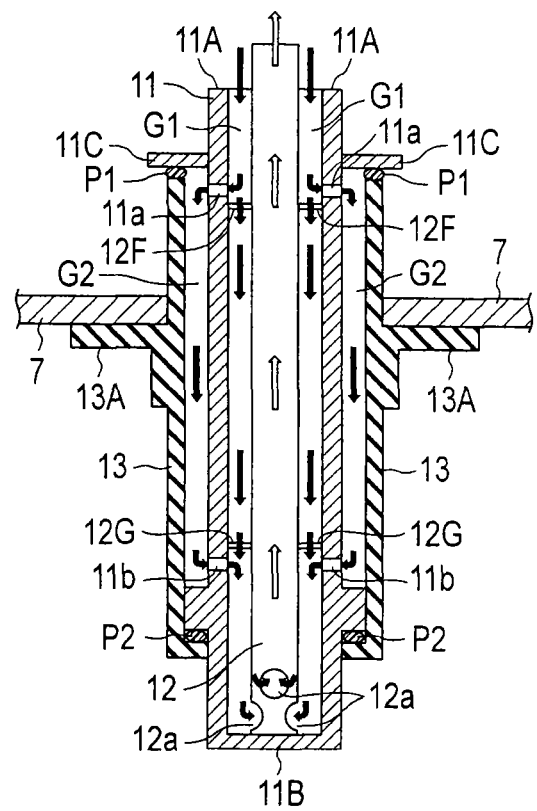
FIG. 11 is a vertical cross sectional diagram showing another modification of the high pressure bushing shown in FIG. 2.
Figure 12:
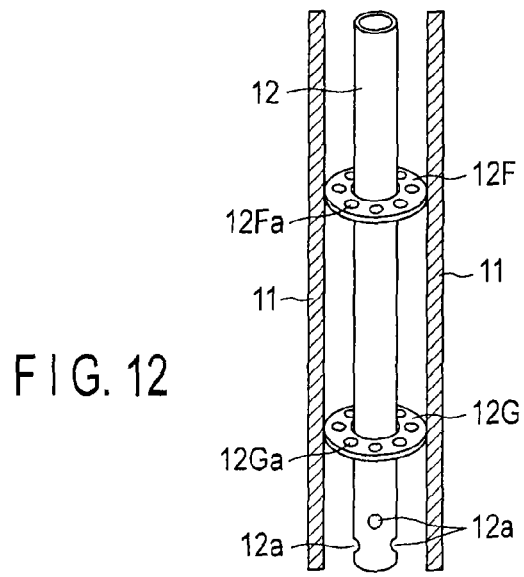
FIG. 12 is a perspective diagram showing an example of a structure of partition plates 12F, 12G and the like having communication holes shown in FIG. 11.

FIG. 11 is a vertical cross sectional diagram showing another modification of the high pressure bushing shown in FIG. 2. Further, FIG. 12 is a perspective diagram showing an example of a structure of partition plates 12F, 12G and the like having communication holes shown in FIG. 11;

In the example of FIG. 11, a partition plate 12F with communicating holes that includes a plurality of communicating holes is provided in the inner circumference side passage of the hollow connecting conductor 11 in a position farther from the machine than the communicating holes 11a, and a partition plate 12G with communicating holes that includes a plurality of communicating holes is provided in the inner circumference side passage of the hollow connecting conductor 11 in a position nearer to the machine than the communicating holes 11b. For example, as shown in FIG. 12, the partition plates 12F, 12G with the communicating holes having the same outer diameter as an inner diameter of the hollow connecting conductor 11 are attached and fixed to the outer circumferential surface of the gas circulation pipe 12 and the inner circumferential surface of the hollow connecting conductor 11 respectively within the inner circumference side passage of the hollow connecting conductor 11. Due to this, the gas circulation pipe 12 is firmly supported by the partition plates 12F, 12G with the communicating holes.

Figure 13A:
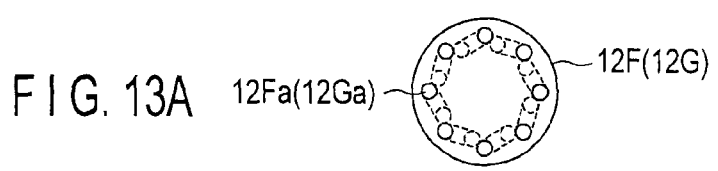
FIGS. 13A and 13B are a plan diagram and a side diagram showing an example of the structure of the partition plates 12F, 12G and the like having the communication holes shown in FIG. 12.
Figure 13B:
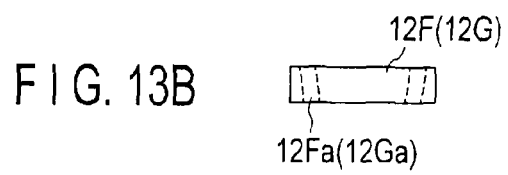
Figure 14:
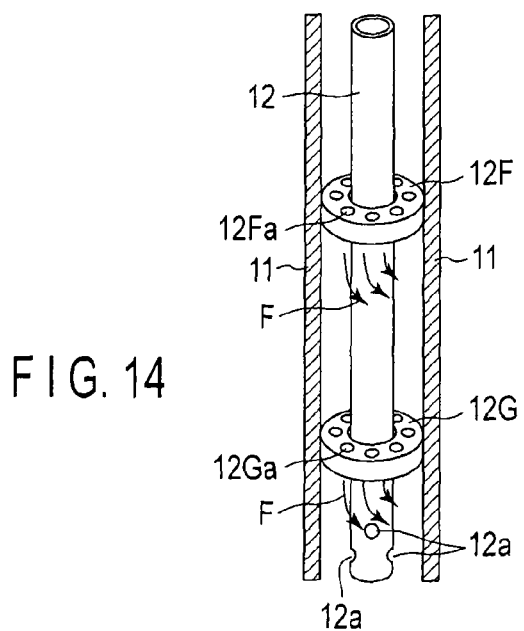
FIG. 14 is a perspective diagram showing a rotational flow F of a cooling gas that passes through the communicating hole of the partition plate.

Further, as shown in the plan diagram of FIG. 13A and the side diagram of FIG. 13B, the plurality of communicating holes 12Fa provided in the partition plate 12F with the communicating holes and the plurality of communicating holes 12Ga provided in the partition plate 12G with the communicating holes respectively have an orientation along which the cooling gas flows tilted from the machine outer side toward a circumferential direction. Due to this, as shown in FIG. 14, a rotational flow F is induced in the cooling gas that had passed the respective communicating holes 12Fa, 12Ga.

By configuring as above, similar effects as in the examples of FIG. 7 to FIG. 10 can be obtained, and since the outer diameter of the partition plates 12F, 12G with the communicating holes is made to match the inner diameter of the hollow connecting conductor 11, the cooling gas can easily be branched, and a circulation loss at the merging portions of the cooling gas in the vicinity of the communicating holes 11b can be reduced. Further, since the rotational flow F is induced in the cooling gas that had passed the plurality of communicating holes 12Fa, 12Ga respectively provided in the partition plates 12F, 12G with the communicating holes, cooling of the inner circumferential surface of the hollow connecting conductor 11 can further be enhanced.

Second Embodiment

Next, the second embodiment will be described with reference to FIG. 15 to FIG. 24B. Notably, elements common to the drawings are given the same signs. Hereinbelow, description of portions that are common with the aforementioned first embodiment will be omitted, and portions that differ will mainly be described.

Figure 15:
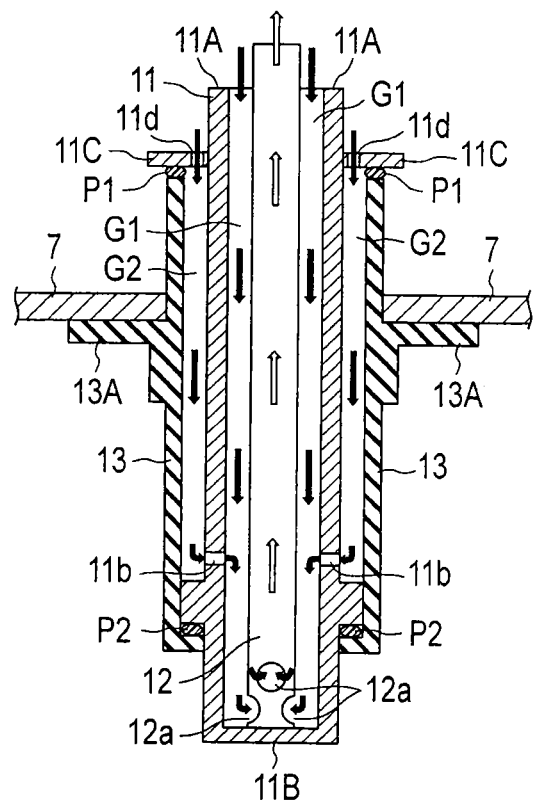
FIG. 15 is a vertical cross sectional diagram showing an example of a structure of a high pressure bushing and a cooling gas circulating flow of a second embodiment.
Figure 16:
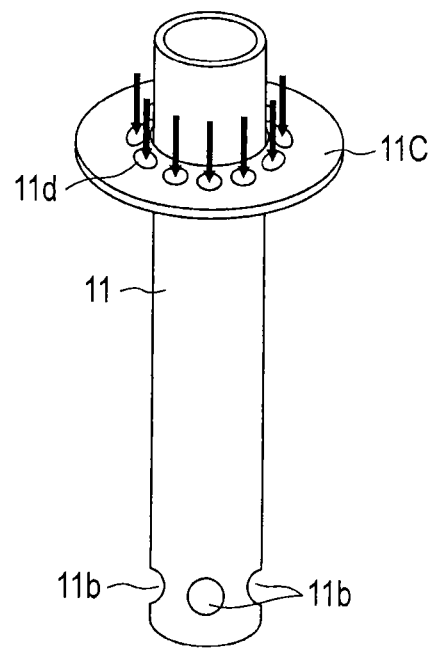
FIG. 16 is a perspective diagram showing an example of structures of a hollow connecting conductor 11 and a connecting conductor support 11C shown in FIG. 15.

FIG. 15 is a vertical cross sectional diagram showing an example of a structure of a high pressure bushing and a cooling gas circulating flow of the second embodiment. Further, FIG. 16 is a perspective diagram showing an example of structures of a hollow connecting conductor 11 and a connecting conductor support 11C shown in FIG. 15.

In the aforementioned example of FIG. 2, a case in which the high pressure bushing includes the plurality of communicating holes 11a in the hollow connecting conductor 11 was exemplified, the high pressure bushing shown in the example of FIG. 15 does not have the same, and includes a plurality of communicating holes 11d in the connecting conductor support 11C instead. The communicating holes 11d introduce a cooling gas within a device to a gap G2.

According to the aforementioned configuration, the cooling gas within the machine is introduced into a gap G1 from a machine inner side end portion 11A of the hollow connecting conductor 11, and passes through an inner circumference side passage of the hollow connecting conductor 11, whereas on the other hand, the cooling gas within the machine is also introduced into the gap G2 through the communicating holes 11d of the connecting conductor support 11C, passes through an outer circumference side passage of the hollow connecting conductor 11, passes through communicating holes 11b, and merges with the cooling gas that passed through the inner circumference side passage of the hollow connecting conductor 11, and the merged cooling gas passes through reflux holes 12a and passes through the inner side of a gas circulation pipe 12, and is discharged to a machine inner side.

By configuring as above, similar to the aforementioned first embodiment, since the cooling gas flows in both the inner circumference side passage and the outer circumference side passage of the hollow connecting conductor 11, the hollow connecting conductor 11 can sufficiently be cooled from both surfaces of the inner circumferential surface and the outer circumferential surface, and cooling of gaskets P1, P2 and the like can also be performed sufficiently, so cooling efficiency of the entire high pressure bushing can be improved.

Figure 17:
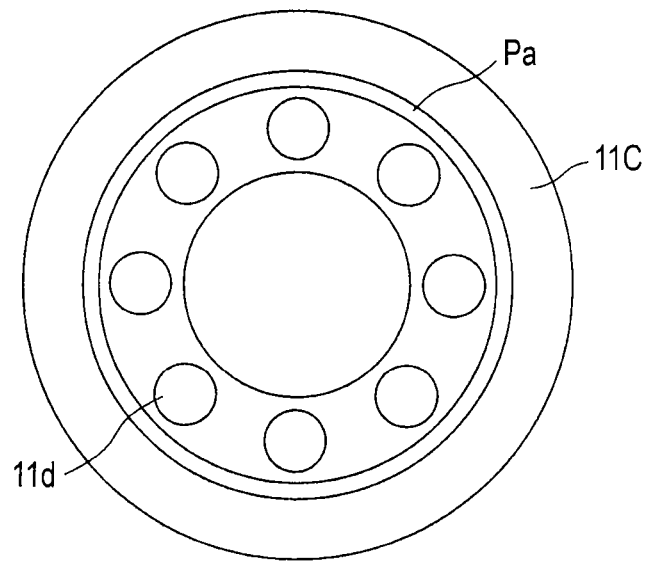
FIG. 17 is a plan diagram showing an example of the structure of the connecting conductor support 11C shown in FIG. 15 and FIG. 16.
Figure 18:
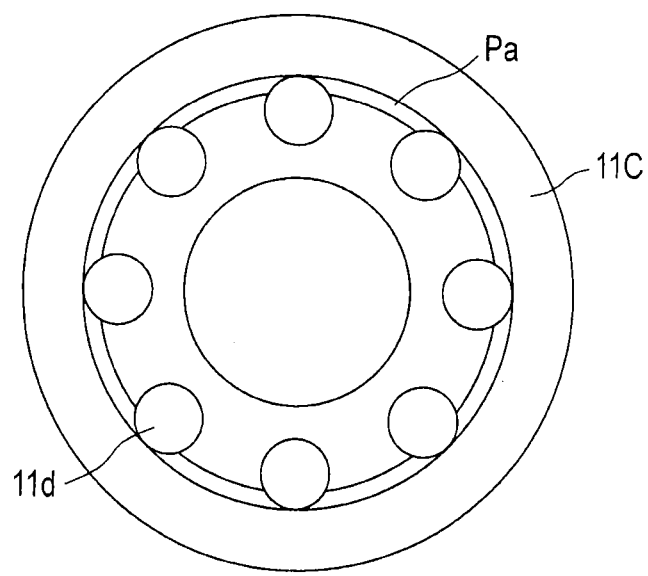
FIG. 18 is a plan diagram showing a modification of the connecting conductor support 11C shown in FIG. 17.

FIG. 17 is a plan diagram showing an example of the structure of the connecting conductor support 11C shown in FIG. 15 and FIG. 16. Further, FIG. 18 is a plan diagram showing a modification of the connecting conductor support 11C shown in FIG. 17.

In the example of FIG. 17, the plurality of communicating holes 11d provided in the connecting conductor support 11C is arranged with a regular interval in a circumferential direction at an inner diameter side than a gasket retaining position Pa. On the other hand, in the example of FIG. 18, each of the plurality of communicating holes 11d provided in the connecting conductor support 11C is made larger, for example by enlarging the plurality of communicating holes 11d to the vicinity of an outer side of the gasket retaining position Pa, and is arranged with a regular interval in the circumferential direction. Although either arrangements in FIG. 17 and FIG. 18 may be employed, in a case of arranging the plurality of communicating holes 11d similar to FIG. 18, since the communicating holes 11d can be enlarged while maintaining a sealing function of the gasket P1, a gas flow pressure loss upon when the cooling gas passes by can be reduced, and an amount of gas flow can be increased, cooling of an outer circumferential surface of the hollow connecting conductor 11, the gasket P1 and the like can further be enhanced.

Figure 19:
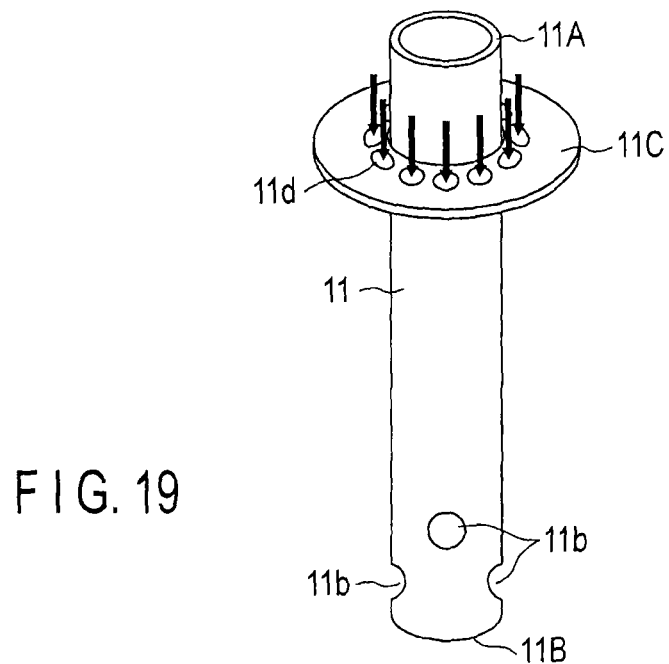
FIG. 19 is a perspective diagram showing a modification of the hollow connecting conductor 11 and the connecting conductor support 11C shown in FIG. 16.

FIG. 19 is a perspective diagram showing a modification of the hollow connecting conductor 11 and the connecting conductor support 11C shown in FIG. 16.

In the example of FIG. 19, the plurality of communicating holes 11b provided in the hollow connecting conductor 11 form a zigzag alignment similar to the plurality of communicating holes 11b shown in FIG. 4. By configuring as above, the cooling gas appropriately disperses, and temperature equalization becomes possible.

Figure 20:
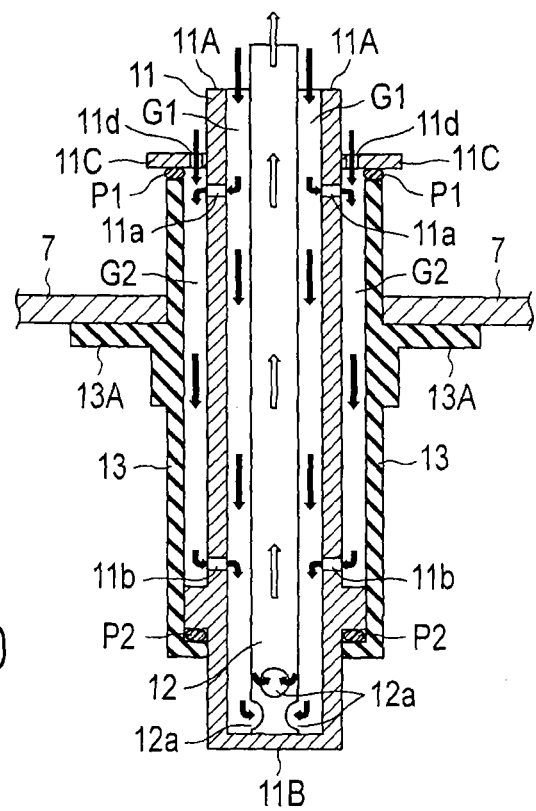
FIG. 20 is a vertical cross sectional diagram showing a modification of the high pressure bushing shown in FIG. 15.

FIG. 20 is a vertical cross sectional diagram showing a modification of the high pressure bushing shown in FIG. 15.

In the example of FIG. 20, same members as the plurality of communicating holes 11a shown in FIG. 2 as above are additionally provided in the hollow connecting conductor 11.

By configuring as above, since the cooling gas within the machine enters through both the communicating holes 11a and the communicating holes 11d, larger amount of cooling gas can be introduced into the gap G2, and cooling of the outer circumferential surface of the hollow connecting conductor 11, the gaskets P1, P2 and the like can further be enhanced.

FIG. 21 is a perspective diagram showing a modification of the hollow connecting conductor 11 and the connecting conductor support 11C shown in FIG. 20.

In the example of FIG. 21, similar to the example of FIG. 4, a plurality of communicating holes 11a and a plurality of communicating holes 11b provided in the hollow connecting conductor 11 respectively form zigzag alignments. By configuring as above, similar to the example of FIG. 4, the cooling gas suitably disperses, and temperature equalization can be obtained.

FIG. 22 is a vertical cross sectional diagram showing another modification of the high pressure bushing shown in FIG. 20.

Similar to the example of FIG. 5, the plurality of communicating holes 11a, 11b shown in the example of FIG. 22 has an orientation of the flow of the cooling gas tilted toward the machine outer side from the direction vertical to the wall surface of the hollow connecting conductor 11. By configuring as above, similar to the example of FIG. 5, the gas flow pressure loss such as branching loss and colliding loss upon the cooling gas passing through the communicating holes 11a, 11b can be reduced.

Notably, according to the first embodiment, as in FIG. 7 to FIG. 14, various examples that adjusts the amount distribution of the cooling gas flowing in both the inner circumference side passage and the outer circumference side passage of the of the hollow connecting conductor 11 by providing a structure that causes a part of a cross sectional area of an inner circumference side passage of the hollow connecting conductor 11 to be smaller have been described, however, these methods can be adapted to a high pressure bushing shown in FIG. 20 to FIG. 22.

For example, the baffle plates 12A, 12B shown in FIG. 7, the umbrella-shaped (or conical parallelepiped-shaped) wind shield plates 12C, 12D shown in FIG. 9, the intermediate thick portion 12E shown in FIG. 10, and the partition plates 12F, 12G with communicating holes shown in FIG. 11 to FIG. 14 may respectively be provided in the high pressure bushing shown in FIG. 20 to FIG. 22.

Figure 23:
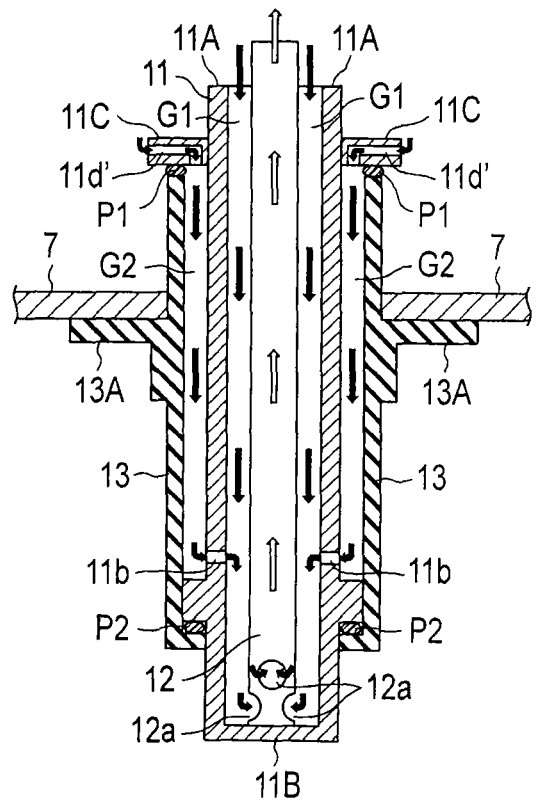
FIG. 23 is a vertical cross sectional diagram showing another modification of the high pressure bushing shown in FIG. 15.

FIG. 23 is a vertical cross sectional diagram showing another modification of the high pressure bushing shown in FIG. 15. Further, FIGS. 24A and 24B are a side diagram and a plan diagram showing an example of the structure of a connecting conductor support 11C shown in FIG. 23.

Figure 24A:
FIGS. 24A and 24B are a side diagram and a plan diagram showing an example of structure of the connecting conductor support 11C shown in FIG. 23.
Figure 24B:
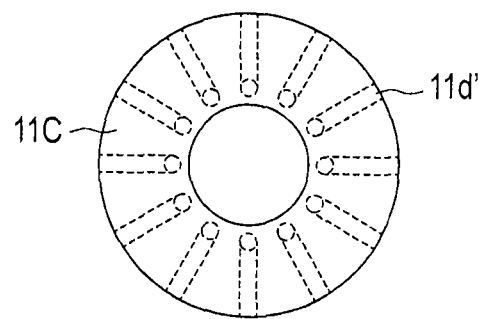

In the above example of FIG. 15, the case in which the plurality of communicating holes 11d supported by the connecting conductor support 11C intakes the cooling gas within the machine from the machine inner side and flows the same along the longitudinal direction of the hollow connecting conductor 11 into the gap G2 was exemplified, however, in the example of FIG. 23, as shown in the side diagram of FIG. 24A and the plan diagram of FIG. 24B, a plurality of communicating holes 11d' provided in the connecting conductor support 11C is configured to intake the cooling gas within the machine from a side surface portion on the outer circumference side of the connecting conductor support 11C toward a radially inner direction, to change an orientation of the gas to the longitudinal direction of the hollow connecting conductor 11 on the way, and to flow the gas to the gap G2.

This configuration is effective in cases where sufficient size for providing the plurality of communicating holes 11d as shown in FIG. 15 and FIG. 16 is not ensured in a region in the machine inner side of the connecting conductor support 11C.

Third Embodiment

Next, the third embodiment will be described with reference to FIG. 25 to FIG. 29. Notably, elements common to the drawings are given the same signs. Hereinbelow, description of portions that are common with the aforementioned first embodiment will be omitted, and portions that differ will mainly be described.

Figure 25:
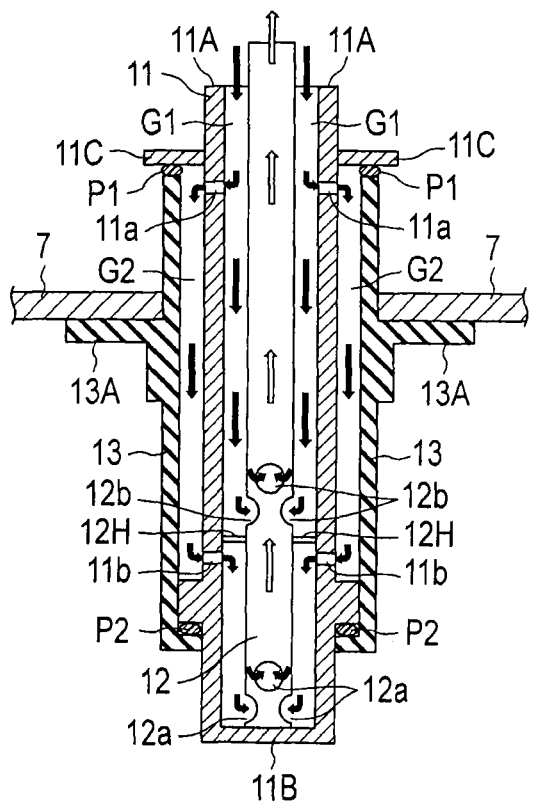
FIG. 25 is a vertical cross sectional diagram showing an example of a structure of a high pressure bushing and a cooling gas circulating flow of a third embodiment.
Figure 26:
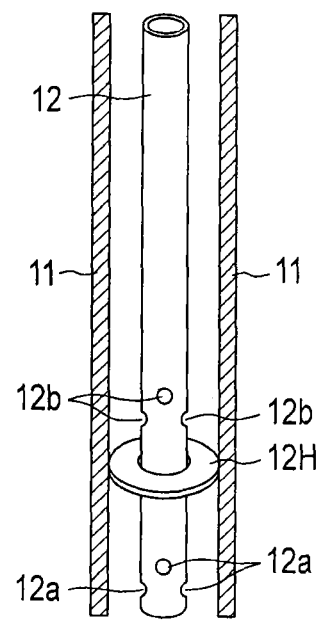
FIG. 26 is a perspective diagram showing an example of a structure of a partition plate 12H and the like shown in FIG. 25.

FIG. 25 is a vertical cross sectional diagram showing an example of a structure of a high pressure bushing and a cooling gas circulating flow of the third embodiment. Further, FIG. 26 is a perspective diagram showing an example of a structure of a partition plate 12H and the like shown in FIG. 25.

In the example of FIG. 25, a partition plate 12H that divides a gap G1 in a longitudinal direction is located in a position farther from the machine than but in the vicinity of communicating holes 11b. Further, in addition to reflux holes 12a located in the vicinity of a machine outer side end portion of a gas circulation pipe 12, the gas circulation pipe 12 includes reflux holes 12b located in a position nearer to the machine than but in the vicinity of the partition plate 12H. For example, as shown in FIG. 26, the partition plate 12H having an outer diameter that is identical to an inner diameter of a hollow connecting conductor 11 is attached and fixed to an outer circumferential surface of the gas circulation pipe 12 and an inner circumferential surface of the hollow connecting conductor 11 so as to close an inner circumference side passage of the hollow connecting conductor 11. Due to this, the gas circulation pipe 12 is firmly supported by the partition plate 12H.

By the aforementioned configuration, the cooling gas within the machine is introduced into a gap G1 from the machine inner side end portion of the hollow connecting conductor 11, and while passing through an inner circumference side passage of the hollow connecting conductor 11 and passing through the reflux holes 12b, a part of the cooling gas introduced into the gap G1 passes through first communicating holes 11a and is introduced into the gap G2, passes through an outer circumference side passage of the hollow connecting conductor 11, passes through the communicating holes 11b, passes through the inner circumference side passage of the hollow connecting conductor 11, passes through the reflux holes 12a, and passes through the inner side of the gas circulation pipe 12, and merges with the cooling gas that passed through the reflux holes 12b, and the merged cooling gas passes through the inner side of the gas circulation pipe 12, and is discharged to the machine inner side.

By configuring as above, similar to the aforementioned first and second embodiments, since the cooling gas flows in both the inner circumference side passage and the outer circumference side passage of the hollow connecting conductor 11, the hollow connecting conductor 11 can sufficiently be cooled from both surfaces of the inner circumferential surface and the outer circumferential surface, and cooling of gaskets P1, P2 and the like can also be performed sufficiently, so cooling efficiency of the entire high pressure bushing can be improved.

Further, since the partition plate 12H avoids the cooling gas to merge in the inner circumference side passage of the hollow connecting conductor 11, and thereby a location at which the cooling gas merges comes to be within the gas circulation pipe 12 instead of the inner circumference side passage of the hollow connecting conductor 11, an influence of merging loss to cooling of the hollow connecting conductor 11 can be reduced, and the cooling of the hollow connecting conductor 11 can further be enhanced.

Figure 27:
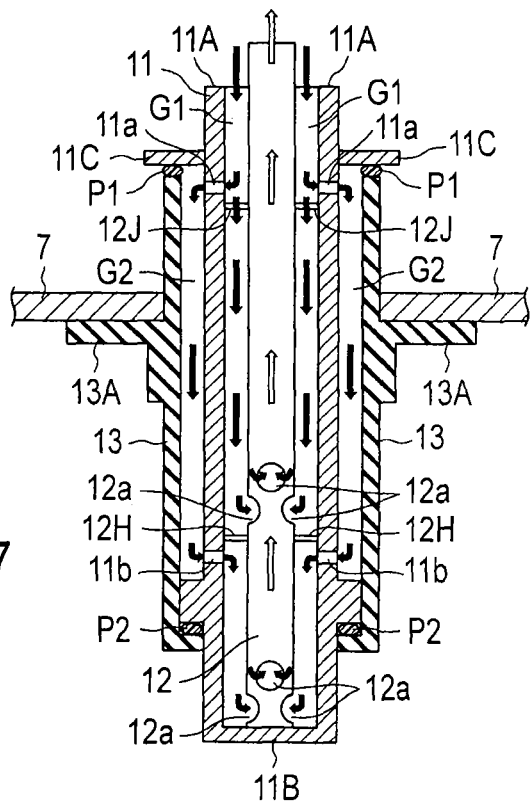
FIG. 27 is a vertical cross sectional diagram showing a modification of the high pressure bushing shown in FIG. 25.
Figure 28:
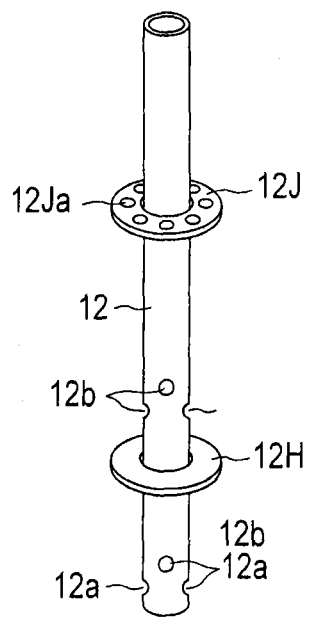
FIG. 28 is a perspective diagram showing an example of a structure of a partition plate 12J and the like having a communication hole shown in FIG. 27.

FIG. 27 is a vertical cross sectional diagram showing a modification of the high pressure bushing shown in FIG. 25. Further, FIG. 28 is a perspective diagram showing an example of a structure of a partition plate 12J and the like having a communication hole shown in FIG. 27.

In the example of FIG. 27, there is provided a partition plate 12J having a plurality of communicating holes in a position farther from the machine than the communicating holes 11a in the inner circumference side passage of the hollow connecting conductor 11. For example, as shown in FIG. 28, the partition plate 12J having communication holes that has the same outer diameter as the inner diameter of the hollow connecting conductor 11 is attached and fixed to an outer circumferential surface of the gas circulation pipe 12 and an inner circumferential surface of the hollow connecting conductor 11 at within the inner circumference side passage of the hollow connecting conductor 11. Due to this, the gas circulation pipe 12 is firmly supported by the partition plate 12J.

Further, a plurality of communicating holes 12Ja provided in the partition plate 12J having communication holes may have an orientation of a flow of a cooling gas tilted from a machine outer side toward a circumferential direction. Due to this, since a rotational flow is induced in the cooling gas that has passed through the respective communicating holes, cooling of the inner circumferential surface of the hollow connecting conductor 11 can further be enhanced.

By configuring as above, in addition to being able to adjust an amount distribution of the cooling gas flowing in both the inner circumference side passage and the outer circumference side passage of the hollow connecting conductor 11 with satisfactory balance, since the rotational flow is induced in the cooling gas that has passed through the plurality of communicating hole 12Ja provided in the partition plate 12J having communication holes, the cooling of the inner circumferential surface of the hollow connecting conductor 11 can further be enhanced.

Notably, according to the first embodiment, as in FIG. 7 to FIG. 14, various examples that adjusts the amount distribution of the cooling gas flowing in both the inner circumference side passage and the outer circumference side passage of the of the hollow connecting conductor 11 by providing a structure that causes a part of a cross sectional area of an inner circumference side passage of the hollow connecting conductor 11 to be smaller have been described, however, these methods can be adapted to a high pressure bushing shown in FIG. 25 and the like.

For example, the baffle plate 12A shown in FIG. 7, the umbrella-shaped (or conical parallelepiped-shaped) wind shield plate 12C shown in FIG. 9, and the intermediate thick portion 12E shown in FIG. 10 may respectively be provided in the high pressure bushing shown in FIG. 25.

Figure 29:
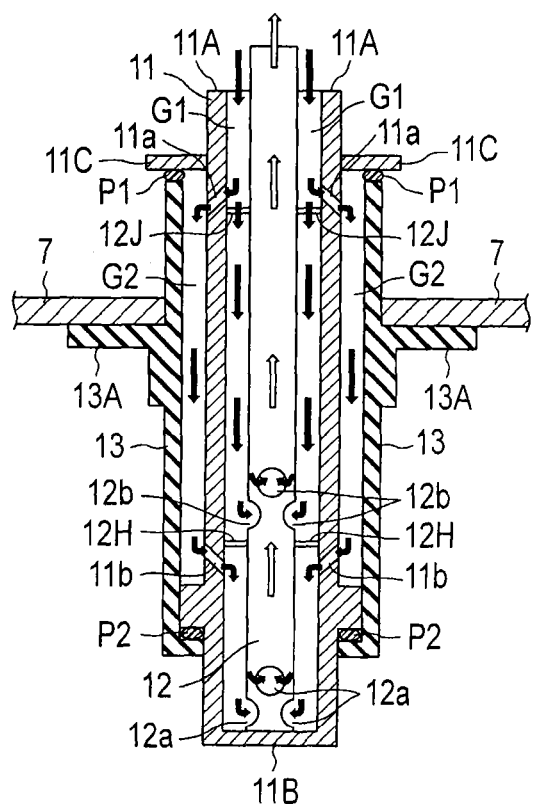
FIG. 29 is a vertical cross sectional diagram showing another modification of the high pressure bushing shown in FIG. 27.

FIG. 29 is a vertical cross sectional diagram showing another modification of the high pressure bushing shown in FIG. 27.

Similar to the example of FIG. 5, the plurality of communicating holes 11a, 11b shown in the example of FIG. 29 has the orientation of the flow of the cooling gas tilted toward the machine outer side from the direction vertical to the wall surface of the hollow connecting conductor 11. By configuring as above, similar to the example of FIG. 5, the gas flow pressure loss such as branching loss and colliding loss upon the cooling gas passing through the communicating holes 11a, 11b can be reduced.

Fourth Embodiment

Next, the fourth embodiment will be described with reference to FIG. 30 to FIG. 35. Notably, elements common to the drawings are given the same signs. Hereinbelow, description of portions that are common with the aforementioned third embodiment will be omitted, and portions that differ will mainly be described.

Figure 30:
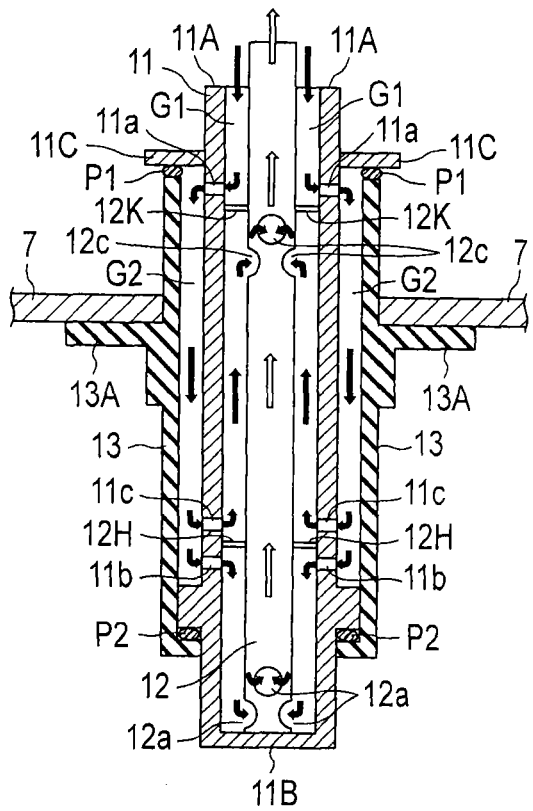
FIG. 30 is a vertical cross sectional diagram showing an example of a structure of a high pressure bushing and a cooling gas circulating flow of the fourth embodiment.

FIG. 30 is a vertical cross sectional diagram showing an example of a structure of a high pressure bushing and a cooling gas circulating flow of the fourth embodiment. Further, FIG. 31 is a perspective diagram showing an example of a structure of partition plates 12H, 12K and the like shown in FIG. 30.

In the example of FIG. 30, a hollow connecting conductor 11 includes communicating holes 11a located on a machine inner side, and communicating holes 11b located on a machine outer side, and in addition, communicating holes 11c located in a position nearer to the machine than but in the vicinity of the communicating holes 11b are also included. Further, the partition plate 12K that divides a gap G1 in a longitudinal direction is located in a position farther from the machine than but in the vicinity of the communicating holes 11a, and the partition plate 12H that similarly divides the gap G1 in the longitudinal direction is provided in the vicinity of an intermediate position between the communicating holes 11b and the communicating holes 11c. The gas circulation pipe 12 includes reflux holes 12a located in the vicinity of a machine outer side end portion of the gas circulation pipe 12, and reflux holes 12c located in a position farther from the machine than but in the vicinity of the partition plate 12K. For example, as shown in FIG. 31, the partition plates 12K, 12H having an outer diameter that is identical to an inner diameter of the hollow connecting conductor 11 are respectively attached and fixed to an outer circumferential surface of the gas circulation pipe 12 and an inner circumferential surface of the hollow connecting conductor 11 so as to close an inner circumference side passage of the hollow connecting conductor 11. Due to this, the gas circulation pipe 12 is firmly supported by the partition plates 12K, 12H.

By the aforementioned configuration, a cooling gas within the machine is introduced into the gap G1 from the machine inner side end portion of the hollow connecting conductor 11, passes through the communicating holes 11a, is introduced into the gap G2, and passes through the outer circumference side passage of the hollow connecting conductor 11, and while a part of the cooling gas that has passed the outer circumference side passage of the hollow connecting conductor 11 passes through the communicating holes 11b, passes through the inner circumference side passage of the hollow connecting conductor 11, passes through the reflux holes 12a, and passes through inside of the gas circulation pipe 12, another part of the cooling gas that has passed the outer circumference side passage of the hollow connecting conductor 11 passes through the communicating holes 11c, passes through the inner circumference side passage of the hollow connecting conductor 11, passes through the reflux holes 12c, and merges with the cooling gas that has passed inside the gas circulation pipe 12, and a merged cooling gas passes through the inner side of the gas circulation pipe 12, and is discharged to the machine inner side.

By configuring as above, similar to the aforementioned first to third embodiments, since the cooling gas flows in both the inner circumference side passage and the outer circumference side passage of the hollow connecting conductor 11, the hollow connecting conductor 11 can sufficiently be cooled from both surfaces of the inner circumferential surface and the outer circumferential surface, and cooling of gaskets P1, P2 and the like can also be performed sufficiently, so cooling efficiency of the entire high pressure bushing can be improved.

Further, since the communicating holes 11b, 11c and the partition plates 12H, 12K avoid the cooling gas to merge in the inner circumference side passage of the hollow connecting conductor 11, and thereby a location at which the cooling gas merges comes to be within the gas circulation pipe 12 instead of the inner circumference side passage of the hollow connecting conductor 11, an influence of merging loss to cooling of the hollow connecting conductor 11 can be reduced, and the cooling of the hollow connecting conductor 11 can further be enhanced.

Further, aside from a passage in which the cooling gas flows to the machine outer side in the inner circumference side passage of the hollow connecting conductor 11, since a passage in which the cooling gas flows to the machine inner side is also formed, a temperature of the hollow connecting conductor 11 undergoes a temperature equalization, and the cooling efficiency can be improved.

FIG. 32 is a vertical cross sectional diagram showing a modification of the high pressure bushing shown in FIG. 30.

In the example of FIG. 32, a plurality of communicating holes 11d is additionally formed in the connecting conductor support 11C.

By configuring as above, since the cooling gas within the machine enters through both the communicating holes 11a and the communicating holes 11d into the gap G2, the cooling of the outer circumferential surface of the hollow connecting conductor 11, the gaskets P1, P2 and the like can further be enhanced.

Figure 33:
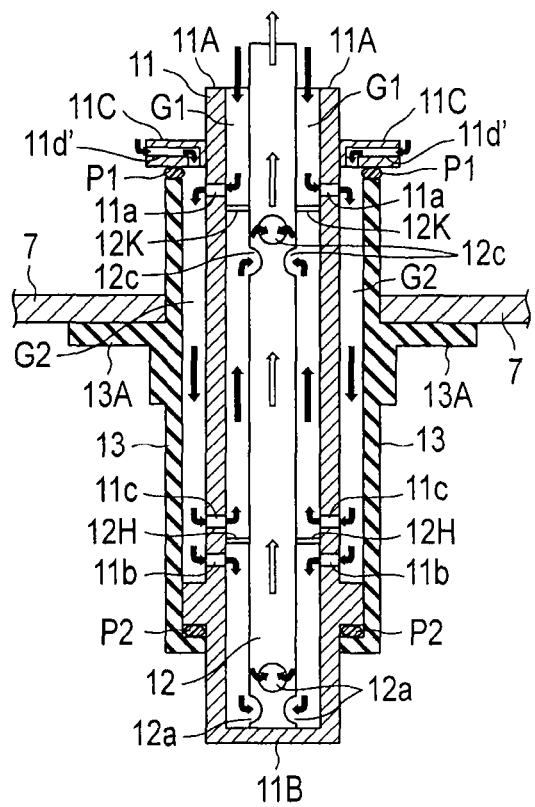
FIG. 33 is a vertical cross sectional diagram showing another modification of the high pressure bushing shown in FIG. 30.

FIG. 33 is a vertical cross sectional diagram showing another modification of the high pressure bushing shown in FIG. 30.

In the example of FIG. 33, similar to the example of FIG. 23, a plurality of communicating holes 11d' provided in the connecting conductor support 11C is configured to intake the cooling gas within the machine from a side surface portion of the connecting conductor support 11C on the outer circumference in a radially inner direction, to change the orientation of the gas in a longitudinal direction of the hollow connecting conductor 11 on the way, and to flow the same to the gap G2.

This configuration is effective in cases where sufficient size for providing the plurality of communicating holes 11d is not ensured in a region in the machine inner side of the connecting conductor support 11C.

Figure 34:
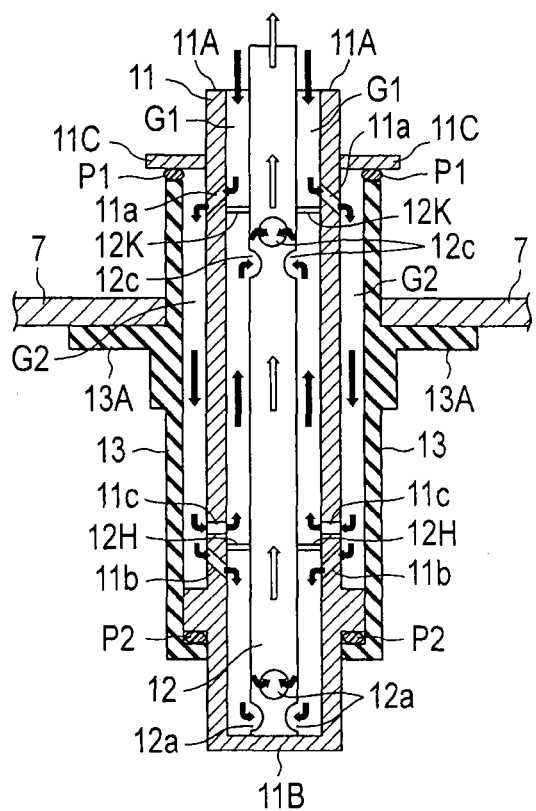
FIG. 34 is a vertical cross sectional diagram showing another modification of the high pressure bushing shown in FIG. 30.

FIG. 34 is a vertical cross sectional diagram showing another modification of the high pressure bushing shown in FIG. 30.

Similar to the example of FIG. 5, a plurality of communicating holes 11a, 11b shown in the example of FIG. 34 has an orientation of the flow of the cooling gas tilted toward the machine outer side from the direction vertical to the wall surface of the hollow connecting conductor 11. By configuring as above, similar to the example of FIG. 5, the gas flow pressure loss such as branching loss and colliding loss upon the cooling gas passing through the communicating holes 11a, 11b can be reduced.

FIG. 35 is a vertical cross sectional diagram showing another modification of the high pressure bushing shown in FIG. 30.

In the example of FIG. 35, the gas circulation pipe 12 has an intermediate thick portion 12E that causes a part of the cross sectional area of the inner circumference side passage of the hollow connecting conductor 11 to be smaller in the machine outer side further than a partition section 12K and in the machine inner side further than a partition section 12H. In this case, the gas circulation pipe 12 has a shape that causes a part of the cross sectional area of the inner circumference side passage of the hollow connecting conductor 11 approaching toward the machine outer side to be reduced from a first area to a second area in the vicinity of the partition section 12K, and has a shape that causes a part of the cross sectional area of the inner circumference side passage of the hollow connecting conductor 11 approaching toward the machine outer side to be enlarged from the second area to the first area in the vicinity of the partition section 12H.

By configuring as above, the amount distribution of the cooling gas flowing through both the communicating holes 11b and the communicating holes 11c of the hollow connecting conductor 11 can be adjusted with satisfactory balance. Further, the amount of the cooling gas flowing through the communicating holes 11b of the hollow connecting conductor 11 can easily be increased, and cooling efficiency of machine outer side end portion 11B can be made higher.

According to the embodiments described in detail above, the cooling gas flow can be improved and the cooling efficiency can be increased while maintaining the basic configuration from before, there is no need to make a value of a current that can be flown small or make the high pressure bushing large by enlarging the conductor cross sectional area; and a high pressure bushing and a rotating electrical machine in which upper limit of the current to be flown can be increased, heat degradation of the member that seals the cooling gas within the machine can be kept to minimum degree, a possibility of leakage of the cooling gas can be made lower, and reliability is increased can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A high pressure bushing arranged through by penetrating a stator frame of a rotating electrical machine in which a cooling gas is sealed, the high pressure bushing comprising:
    a hollow connecting conductor that has a machine outer side end portion sealed, and introduces the cooling gas within the machine from a machine inner side end portion;
    a gas circulation pipe that is arranged in an inner circumference side of the hollow connecting conductor with a first gap, and discharges the cooling gas toward a machine inner side; and
    an insulating cylinder that is arranged in an outer circumference side of the hollow connecting conductor with a second gap, and electrically insulates the hollow connecting conductor and the stator frame, wherein
    at least a communicating hole is provided in the hollow connecting conductor and at least a reflux hole is provided in the gas circulation pipe, such that the cooling gas flows in both of the first gap and the second gap, passes through an inner side of the gas circulation pipe, and is discharged to the machine inner side,
    the hollow connecting conductor includes a first communicating hole located in the machine inner side, and a second communicating hole located in a machine outer side,
    the gas circulation pipe includes a reflux hole located in the vicinity of a machine outer side end portion of the gas circulation pipe, and
    the cooling gas within the machine is introduced into the first gap from the machine inner side end portion of the hollow connecting conductor, and while the cooling gas passes through an inner circumference side passage of the hollow connecting conductor, a part of the cooling gas introduced into the first gap passes through the first communicating hole and is introduced into the second gap, passes in an outer circumference side passage of the hollow connecting conductor, passes through the second communicating hole, and merges with the cooling gas that has passed an inner circumference side passage of the hollow connecting conductor, and a merged cooling gas passes through the reflux hole, passes inside the gas circulation pipe, and is discharged to the machine inner side.

2. A high pressure bushing arranged through by penetrating a stator frame of a rotating electrical machine in which a cooling gas is sealed, the high pressure bushing comprising:
    a hollow connecting conductor that has a machine outer side end portion sealed, and introduces the cooling gas within the machine from a machine inner side end portion;
    a gas circulation pipe that is arranged in an inner circumference side of the hollow connecting conductor with a first gap, and discharges the cooling gas toward a machine inner side; and
    an insulating cylinder that is arranged in an outer circumference side of the hollow connecting conductor with a second gap, and electrically insulates the hollow connecting conductor and the stator frame
    a connecting conductor support that is arranged on an outer circumferential surface of the hollow connecting conductor, and supports the hollow connecting conductor by being connected to a machine inner side end portion of the insulating cylinder, wherein
    at least a communicating hole is provided in the hollow connecting conductor and at least a reflux hole is provided in the gas circulation pipe, such that the cooling gas flows in both of the first gap and the second gap, passes through an inner side of the gas circulation pipe, and is discharged to the machine inner side,
    the connecting conductor support includes a first communicating hole that introduces the cooling gas within the machine into the second gap,
    the hollow connecting conductor includes a second communicating hole located in a machine outer side,
    the gas circulation pipe includes a reflux hole located in the vicinity of a machine outer side end portion of the gas circulation pipe, and
    the cooling gas within the machine is introduced into the first gap from the machine inner side end portion of the hollow connecting conductor, and while the cooling gas passes through an inner circumference side passage of the hollow connecting conductor, the cooling gas within the machine is further introduced into the second gap from the first communicating hole of the connecting conductor support, passes in an outer circumference side passage of the hollow connecting conductor, passes through the second communicating hole, and merges with the cooling gas that has passed an inner circumference side passage of the hollow connecting conductor, and a merged cooling gas passes through the reflux hole, passes inside the gas circulation pipe, and is discharged to the machine inner side.

3. A high pressure bushing arranged through by penetrating a stator frame of a rotating electrical machine in which a cooling gas is sealed, the high pressure bushing comprising:
    a hollow connecting conductor that has a machine outer side end portion sealed, and introduces the cooling gas within the machine from a machine inner side end portion;
    a gas circulation pipe that is arranged in an inner circumference side of the hollow connecting conductor with a first gap, and discharges the cooling gas toward a machine inner side; and
    an insulating cylinder that is arranged in an outer circumference side of the hollow connecting conductor with a second gap, and electrically insulates the hollow connecting conductor and the stator frame, wherein
    at least a communicating hole is provided in the hollow connecting conductor, such that the cooling gas flows in both of the first gap and the second gap, passes through an inner side of the gas circulation pipe, and is discharged to the machine inner side,
    the hollow connecting conductor includes a first communicating hole located in the machine inner side, and a second communicating hole located in a machine outer side, a partition section that divides the first gap in a longitudinal direction is located in a position nearer to the machine than but in the vicinity of the second communicating hole, the gas circulation pipe includes a first reflux hole located in the vicinity of a machine outer side end portion of the gas circulation pipe, and a second reflux hole located in a position nearer to the machine than but in the vicinity of the partition section, and the cooling gas within the machine is introduced into the first gap from the machine inner side end portion of the hollow connecting conductor, and while the cooling gas passes through an inner circumference side passage of the hollow connecting conductor and passes through the second reflux hole, a part of the cooling gas introduced into the first gap passes through the first communicating hole and is introduced into the second gap, passes in an outer circumference side passage of the hollow connecting conductor, passes through the second communicating hole, passes in an inner circumference side passage of the hollow connecting conductor, passes through the first reflux hole, passes inside the gas circulation pipe, and merges with the cooling gas that has passed through the second reflux hole, and a merged cooling gas passes inside the gas circulation pipe, and is discharged to the machine inner side.

4. A high pressure bushing arranged through by penetrating a stator frame of a rotating electrical machine in which a cooling gas is sealed, the high pressure bushing comprising:
  a hollow connecting conductor that has a machine outer side end portion sealed, and introduces the cooling gas within the machine from a machine inner side end portion;
  a gas circulation pipe that is arranged in an inner circumference side of the hollow connecting conductor with a first gap, and discharges the cooling gas toward a machine inner side; and
  an insulating cylinder that is arranged in an outer circumference side of the hollow connecting conductor with a second gap, and electrically insulates the hollow connecting conductor and the stator frame,
  wherein at least a communicating hole is provided in the hollow connecting conductor, such that the cooling gas flows in both of the first gap and the second gap, passes through an inner side of the gas circulation pipe, and is discharged to the machine inner side,
  the hollow connecting conductor includes a first communicating hole located in the machine inner side, a second communicating hole located in a machine outer side, and a third communicating hole located in the machine inner side further than the second communicating hole,
  a first partition section that divides the first gap in a longitudinal direction is located in a position farther from the machine than but in the vicinity of the first communicating hole, and a second partition section that divides the first gap in the longitudinal direction is located in the vicinity of an intermediate position between the second communicating hole and the third communicating hole,
  the gas circulation pipe includes a first reflux hole located in the vicinity of a machine outer side end portion of the gas circulation pipe, and a second reflux hole located in a position farther from the machine than but in the vicinity of the first partition section, and
  the cooling gas within the machine is introduced into the first gap from the machine inner side end portion of the hollow connecting conductor, passes through the first communicating hole and is introduced into the second gap, and passes in an outer circumference side passage of the hollow connecting conductor, and while a part of the cooling gas that has passed in the outer circumference side passage of the hollow connecting conductor passes through the second communicating hole, passes through an inner circumference side passage of the hollow connecting conductor, passes through the first reflux hole, and passes through an inner side of the gas circulation pipe, another part of the cooling gas that passed in the outer circumference side passage of the hollow connecting conductor passes through the third communicating hole, passes in the inner circumference side passage of the hollow connecting conductor, passes through the second reflux hole, and merges with the cooling gas that has passed inside the gas circulation pipe, and a merged cooling gas passes inside the gas circulation pipe, and is discharged to the machine inner side.

5. The high pressure bushing according to any one of claims 1, 3, and 4, further comprising:
  a connecting conductor support that is arranged on an outer circumferential surface of the hollow connecting conductor, and supports the hollow connecting conductor by being connected to a machine inner side end portion of the insulating cylinder,
  wherein the connecting conductor support includes a communicating hole that introduces the cooling gas within the machine into the second gap.

6. The high pressure bushing according to any one of claims 1, 3, and 4, wherein
  at least one of the first communicating hole and the second communicating hole has an orientation of a flow of the cooling gas tilted toward the machine outer side from a direction vertical to a wall surface of the hollow connecting conductor.

7. The high pressure bushing according to claim 1, further comprising:
  a portion configured to cause a part of a cross sectional area of the inner circumference side passage of the hollow connecting conductor to be smaller.

8. The high pressure bushing according to claim 1, wherein
  a first member configured to cause a part of a cross sectional area of the inner circumference side passage of the hollow connecting conductor to be smaller is arranged in a position farther from the machine than the first communicating hole, and
  a second member configured to cause a part of the cross sectional area of the inner circumference side passage of the hollow connecting conductor to be smaller is arranged in a position nearer to the machine than the second communicating hole.

9. The high pressure bushing according to claim 3, wherein
  a first member configured to cause a part of a cross sectional area of the inner circumference side passage of the hollow connecting conductor to be smaller is arranged in the machine outer side further than the first communicating hole.

10. The high pressure bushing according to claim 1, wherein
  a first member configured to cause a part of a cross sectional area of the inner circumference side passage of the hollow connecting conductor approaching toward the machine outer side to be reduced from a first area to a second area is located in the vicinity of the first communicating hole, and
  a second member configured to cause a part of the cross sectional area of the inner circumference side passage of the hollow connecting conductor approaching toward the machine outer side to be enlarged from the second area to the first area is located in the vicinity of the second communicating hole.

11. The high pressure bushing according to claim 1, wherein the gas circulation pipe has a shape that causes a part of a cross sectional area of the inner circumference side passage of the hollow connecting conductor to be smaller in a position farther from the machine than the first communicating hole and to be smaller in a position nearer to the machine than the second communicating hole.

12. The high pressure bushing according to claim 4, wherein the gas circulation pipe has a shape that causes a part of a cross sectional area of the inner circumference side passage of the hollow connecting conductor to be smaller in a position farther from the machine than the first partition section and to be smaller in a position nearer to the machine than the second partition section.

13. The high pressure bushing according to claim 1, wherein a first partition plate that includes a plurality of communicating holes is arranged in a position farther from the machine than the first communicating hole, and a second partition plate that includes a plurality of communicating holes is arranged in a position nearer to the machine than the second communicating hole.

14. The high pressure bushing according to claim 3, wherein a first partition plate that includes a plurality of communicating holes is arranged in a position farther from the machine than the first communicating hole.

15. The high pressure bushing according to claim 13 or 14, wherein each of the plurality of communicating holes has an orientation of a flow of the cooling gas tilted from the machine outer side toward a circumferential direction.

16. The high pressure bushing according to claim 2, wherein the communicating hole included in the connecting conductor support is configured to intake the cooling gas within the machine from a side surface portion of the outer circumference side of the connecting conductor support.

* * * * *